United States Patent
Dry et al.

(10) Patent No.: US 10,723,249 B2
(45) Date of Patent: Jul. 28, 2020

(54) ADJUSTABLE ARMREST ASSEMBLY

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Brian Robert Spahn, Plymouth, MI (US); Srinivasan Sundararajan, Ann Arbor, MI (US); Derek Board, Ferndale, MI (US); Benjamin Yilma, Canton, MI (US); S. M. Akbar Berry, Ontario (CA)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 16/013,422

(22) Filed: Jun. 20, 2018

(65) Prior Publication Data
US 2019/0389350 A1    Dec. 26, 2019

(51) Int. Cl.
*B60N 2/75* (2018.01)
*B60R 21/207* (2006.01)

(52) U.S. Cl.
CPC ............. *B60N 2/753* (2018.02); *B60N 2/77* (2018.02); *B60N 2/777* (2018.02); *B60R 21/207* (2013.01)

(58) Field of Classification Search
CPC .......... B60N 2/753; B60N 2/777; B60N 2/77; B60N 2/79; B60R 21/207
See application file for complete search history.

(56) References Cited

U.S. PATENT DOCUMENTS

| | | | | |
|---|---|---|---|---|
| 5,320,414 A * | 6/1994 | Spykerman | ............ | A47C 7/543 297/411.32 |
| 5,730,458 A * | 3/1998 | Byon | ...................... | B60R 19/00 280/730.2 |
| 5,795,025 A * | 8/1998 | Murphy | ................... | B60N 2/77 297/411.36 |
| 6,220,660 B1 * | 4/2001 | Bedro | ...................... | B60N 2/79 297/188.04 |
| 6,598,934 B1 * | 7/2003 | Anderson | ................ | B60N 2/79 297/162 |
| 6,983,967 B2 * | 1/2006 | Scheidmantal | .......... | B60N 2/75 296/1.09 |
| 7,234,779 B2 | 6/2007 | Bedford et al. | | |
| 8,403,398 B2 | 3/2013 | Schulz | | |
| 9,107,507 B2 * | 8/2015 | Wallis | ...................... | A47C 7/54 |
| 9,616,785 B2 * | 4/2017 | Marini | ............... | B64D 11/0644 |
| 9,623,776 B2 * | 4/2017 | Colsky | ............... | B64D 11/0644 |
| 9,738,188 B2 * | 8/2017 | Honda | ................. | B60N 2/4235 |
| 2016/0272328 A1 * | 9/2016 | McGreevy | ............ | B64D 11/06 |
| 2018/0281725 A1 * | 10/2018 | Nagasawa | ................ | B60N 2/79 |
| 2018/0304789 A1 * | 10/2018 | Robert | ................... | B60N 2/797 |

FOREIGN PATENT DOCUMENTS

| | | |
|---|---|---|
| DE | 10244506 A1 | 4/2004 |
| JP | 2017136994 A | 8/2017 |
| WO | 9947380 A1 | 9/1999 |

* cited by examiner

*Primary Examiner* — Philip F Gabler
(74) *Attorney, Agent, or Firm* — Frank A. MacKenzie; Bejin Bieneman PLC

(57) ABSTRACT

An assembly includes a seat and an armrest moveable relative to the seat. A first arm and a second arm each include a first hinge and a second hinge. The first hinges are spaced from each other and fixed relative to the seat. The second hinges are spaced from each other and fixed relative to the armrest.

20 Claims, 10 Drawing Sheets

ADJUSTABLE ARMREST ASSEMBLY

BACKGROUND

A vehicle seat may include a side airbag that deploys from a side of the seat forward along a side of an occupant during a vehicle impact. In the inflated position, the side airbag inflates along the crest of the pelvic bone, the soft tissues above the pelvic bone, and the lower rib cage. Vehicles may include armrests adjacent the seat. For example, the armrest may be mounted to the seat or to the floor adjacent the seat and may extend upwardly along the side of the seat. The space occupied by the armrest and the space occupied by the airbag in the inflated position may create competing design factors in the design of the seat to ensure that the armrest is in a desired position and does not inhibit the inflation of the side airbag.

DETAILED DESCRIPTION

Figure 1:
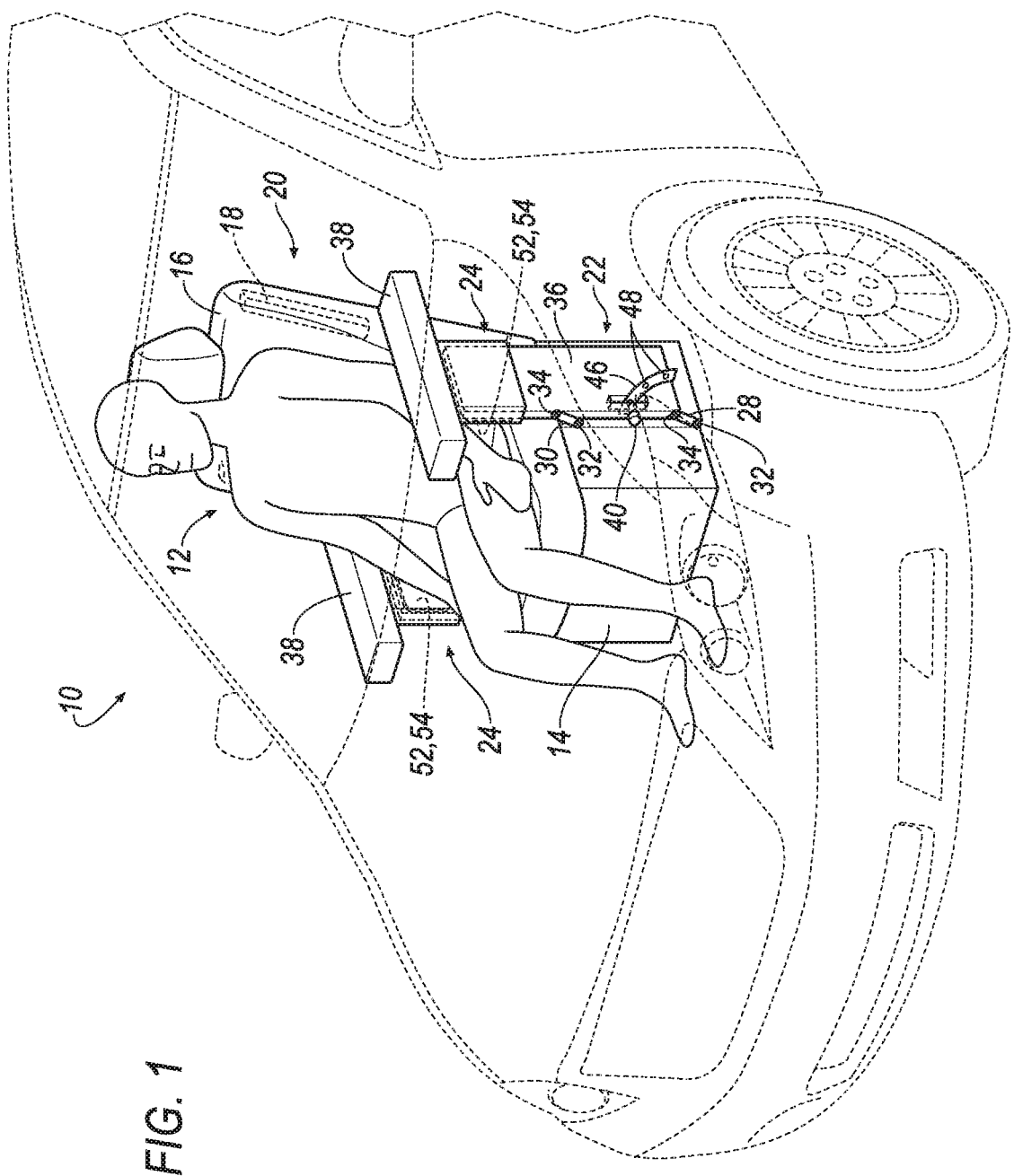
FIG. 1 is a perspective view of a vehicle including a seat and two armrests.

With reference to the Figures, wherein like numerals indicate like parts throughout the several views. An assembly 20 for a vehicle 10 includes a seat 12 and an armrest 24 moveable relative to the seat 12. The assembly 20 includes a first arm 28 and a second arm 30 each including a first hinge 32 and a second hinge 34. The first hinges 32 are spaced from each other and fixed relative to the seat 12. The second hinges 34 are spaced from each other and fixed relative to the armrest 24.

The arms 28, 30 and the hinges 32, 34 allow the armrest 24 to be adjusted toward and away from the seat 12 to accommodate for varying sized occupants. As one example, and as described below, the assembly 20 may be adjusted manually by the occupant to adjust the armrests 24 to a position desired by the occupant. As another example, and as described below, the arms 28, 30 and the hinges 32, 34 allow the armrest 24 to move outwardly during inflation of a side airbag 18 to properly position the armrest 24 relative to the side airbag 18.

With reference to FIG. 1, the vehicle 10 may be of any suitable type. For example, the vehicle 10 may be a sedan, a minivan, a truck. The vehicle 10 includes a passenger cabin. The passenger cabin house occupants, if any, of the vehicle 10. A floor may define a bottom of the passenger cabin.

Figure 2:
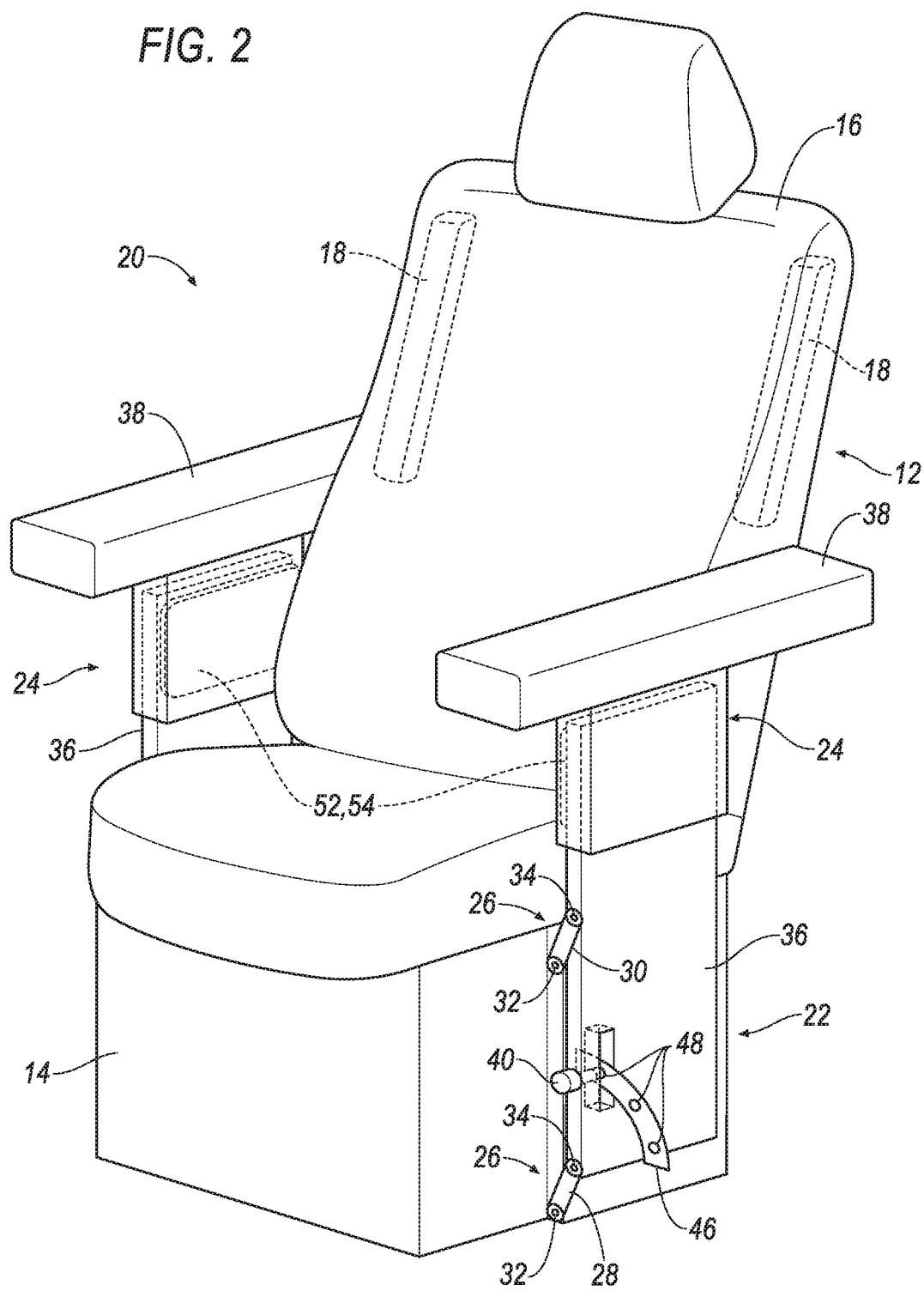
FIG. 2 is a perspective view the seat and armrests.

With reference to FIGS. 1-2, the seat 12 includes a seat bottom 14 and a seatback 16 extending upward from the seat bottom 14. The seat back may be supported by the seat bottom 14. The seatback 16 and the seat bottom 14 may be adjustable relative to each other in multiple degrees of freedom.

The seat 12 may include the side airbag 18. The side airbag 18 may be supported by and deployable from the seatback 16. The side airbag 18 is deployed from the seatback 16 along a side of the occupant. The side airbag 18 may be formed of a woven polymer or any other material. As one example, the side airbag 18 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

An inflator may be connected to the side airbag 18. Upon receiving a signal from, e.g., the vehicle controller, the inflator may inflate the side airbag 18 with an inflatable medium, such as a gas. The inflator may be, for example, a pyrotechnic inflator that uses a chemical reaction to drive inflation medium to the side airbag 18. The inflator may be of any suitable type, for example, a cold-gas inflator.

With continued reference to FIGS. 1-2, the assembly 20 includes an armrest assembly 22. The armrest assembly 22 includes the armrest 24 and an adjustment device 26. As described below, the adjustment device 26 includes the first arm 28 and the second arm 30. The assembly 20 may include any suitable number of armrest assemblies, i.e., one or more.

The armrest assembly 22 is adjacent the seat 12. As an example, as shown in the Figures, the armrest assembly 22 may be supported by, e.g., mounted to, the seat 12. For example, the armrest assembly 22 may be mounted to the seat bottom 14. As another example, the armrest assembly 22 may be mounted to the floor.

The armrest 24 may include a support member 36 and a top 38. The support member 36 supports the top 38. The support member 36 and/or the top 38 may include a frame and a covering of plastic, foam, leather, vinyl, etc. The support member 36 and/or the top 38 may have a class-A surface facing the passenger cabin, i.e., a surface specifically manufactured to have a high-quality, finished aesthetic appearance free of blemishes.

Figure 4A:
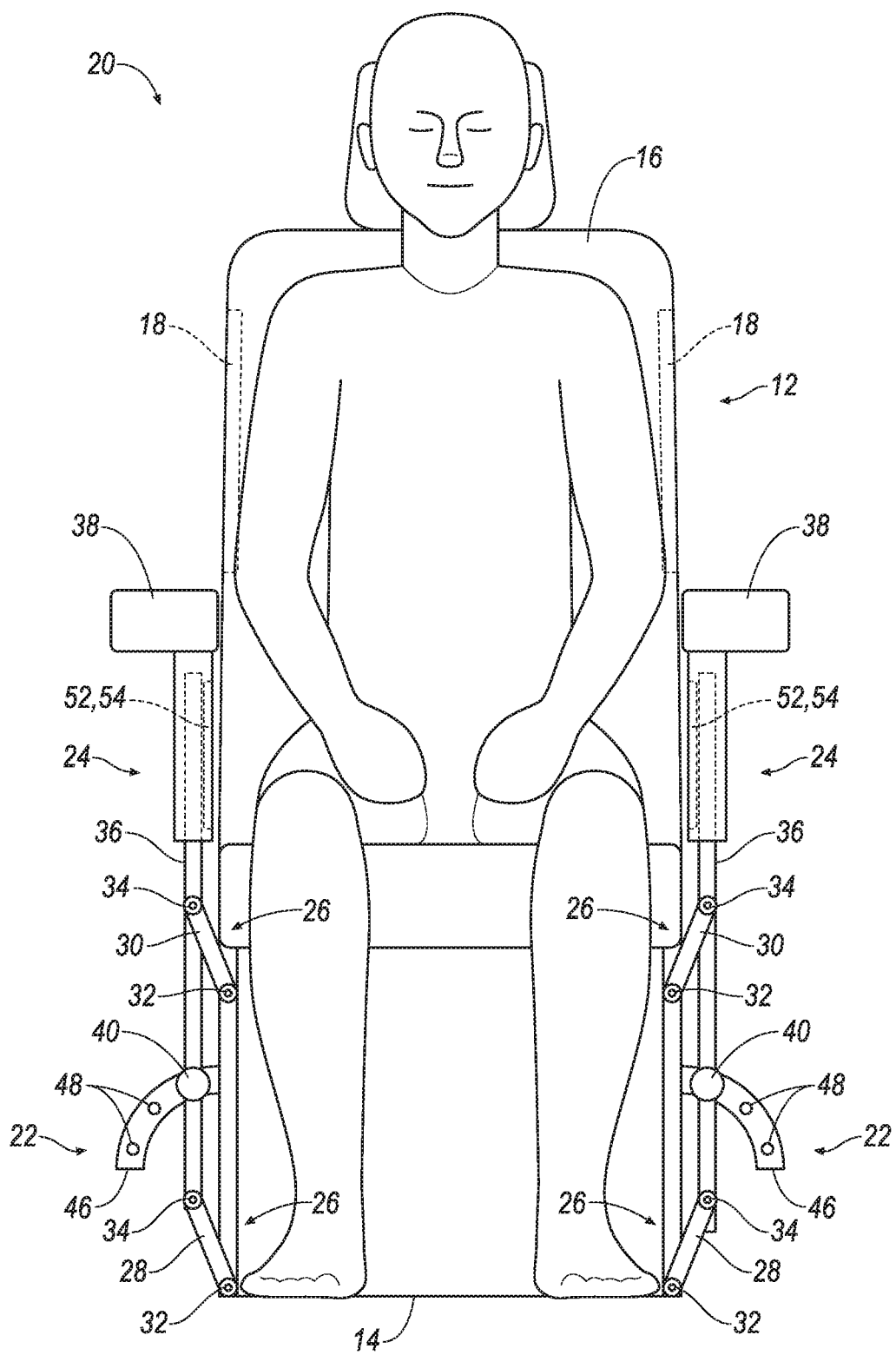
FIG. 4A is a front view of the seat and the armrests with the armrests adjusted to a position for a relatively small occupant.
Figure 4B:
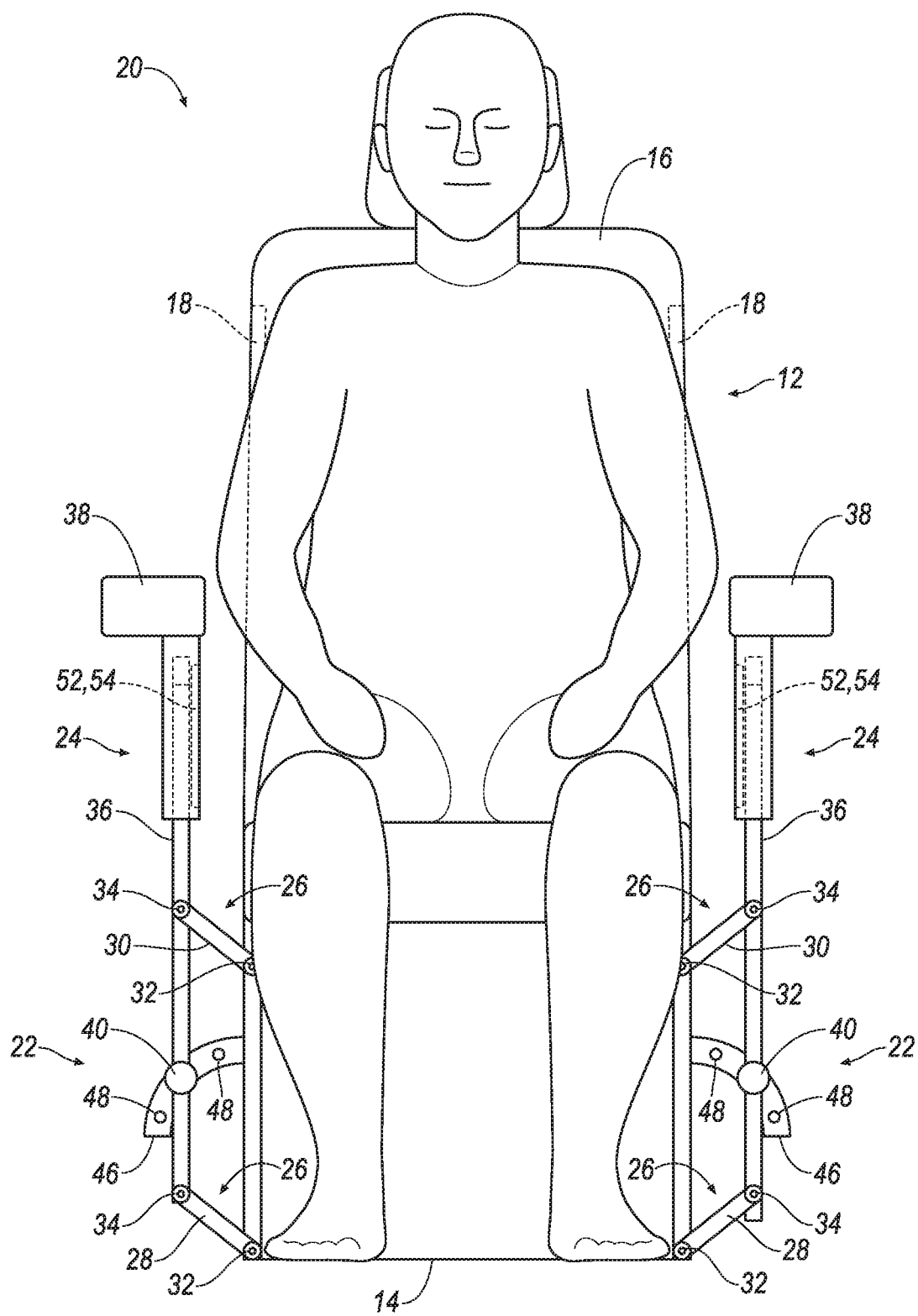
FIG. 4B is a front view of the seat and the armrests with the armrests adjusted to a position for a medium-sized occupant.
Figure 4C:
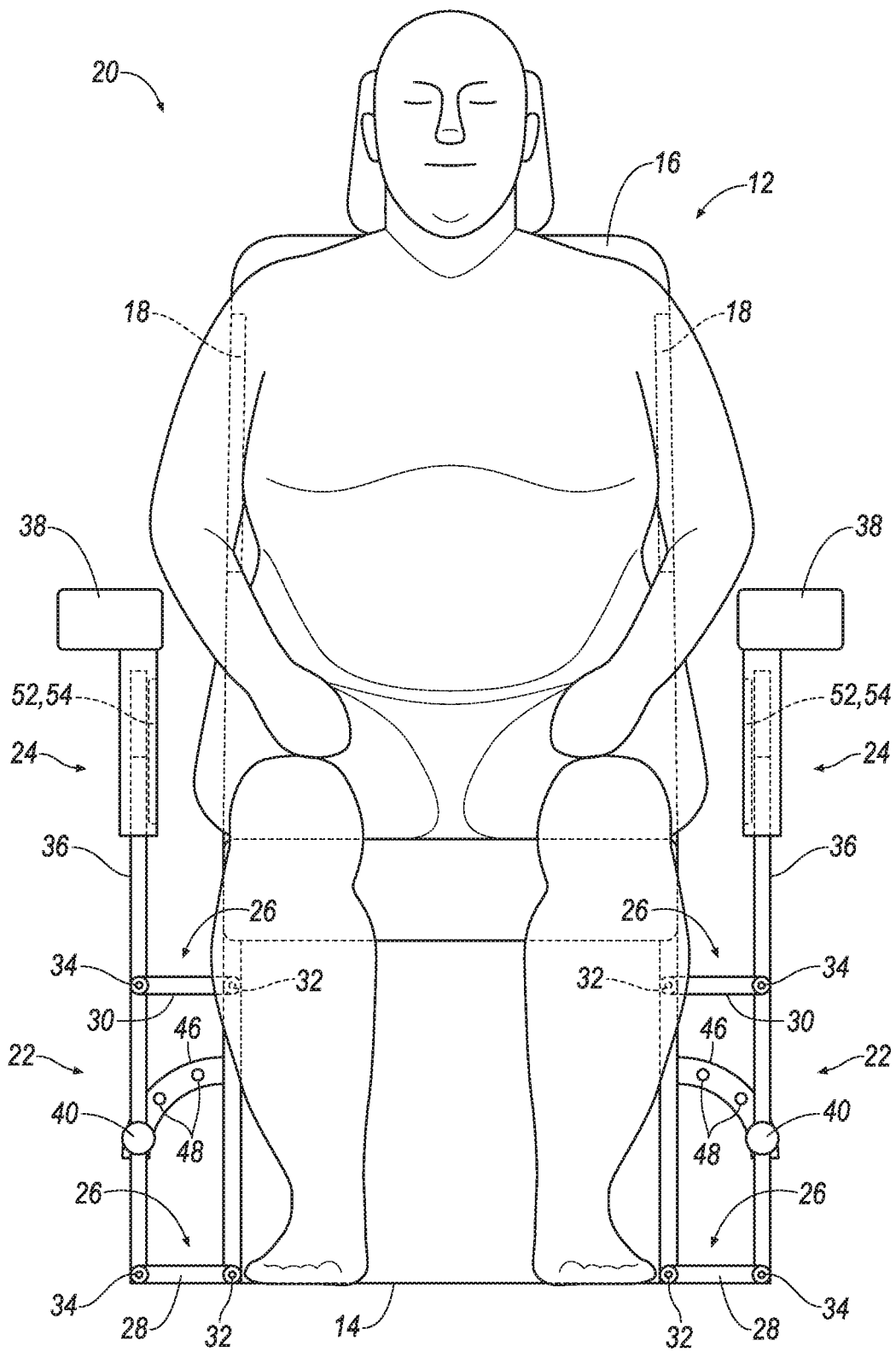
FIG. 4C is a front view of the seat and the armrests with the armrests adjusted to a position for a relatively large occupant.

The armrest assembly 22 is adjustable relative to the seat 12. In other words, as set forth above, the armrest 24 is moveable relative to the seat 12, as shown in FIGS. 4A-4C. For example, the armrest 24 is moveable toward and away from the seat 12 with the adjustment device 26, as described further below. The armrest 24 may be moved manually by the occupant and retained in a desired position, as described below and/or may be moved automatically, for example, to accommodate the side airbag 18 during a vehicle impact.

As another example, the top 38 may be moveable vertically relative to the support member 36 to allow the top 38 to be positioned in a desired vertical position after the armrest 24 is moved toward or away from the seat 12. For example, the top 38 and the support member 36 are telescopically coupled to each other. As one example shown in the Figures, the top 38 telescopically receives the support member 36. The top 38 and the support member 36 may be releasably fixed to each other in any suitable fashion in a desired vertical position, e.g., by a spring-loaded pin, a motor, etc.

With reference to FIGS. 3A-4C, the assembly 20 may include an adjustment device 26. The adjustment device 26 allows the armrest 24 to be moved relative to the seat 12 for adjusting the position of the armrest 24 relative to the occupant. The adjustment device 26 may include the first arm 28 and the second arm 30. The first arm 28 and the second arm 30 hingedly connect the armrest 24 to the seat 12. For example, the first arm 28 and the second arm 30 may be directly connected to both the armrest 24 and the seat 12. In such an example, the armrest 24, the first arm 28, the second arm 30, and the seat 12 are a four-bar linkage.

The first arm 28 and the second arm 30 each include a first hinge 32 and a second hinge 34. The numerical adjectives "first," "second" are used throughout this document merely as identifiers and are not intended to indicate order or importance. The first hinges 32 may be fixed to the seat bottom 14. The second hinges 34 may be fixed to the armrest 24. The first arm 28 and the second arm 30 are rotatable about the first hinges 32, respectively, and the second hinges 34, respectively, to allow the armrest 24 to be moved toward and away from the seat 12.

The armrest assembly 22 may be manually moveable relative to the seat 12 by the occupant. As one example, the adjustment device 26 may include a locking device 40 that engages and disengages the armrest 24, e.g., by manual force applied by the occupant, to allow the armrest 24 to move relative to the seat 12. An example of the locking device 40 is shown in FIGS. 3A-4C. As another example, the assembly 20 may include a motor 44 engaged with at least one of the first arm 28 and the second arm 30 to move the armrest 24 relative to the seat 12, e.g., as shown in FIGS. 6A-B.

With continued reference to FIGS. 3A-4C, the locking device 40 may be between the armrest 24 and the seat 12. The locking device 40 may be movable between an engaged position, shown in FIG. 3B, locking the armrest 24 relative to the seat 12 and a disengaged position, shown in FIG. 3C, releasing the armrest 24 relative to the seat 12. In the embodiment shown in FIGS. 3A-4C, the locking device 40 may be a spring-loaded pin assembly including a retractable pin 42. In such an example, the spring-loaded pin assembly may be of a known type that includes a housing (not numbered) and a spring (not shown) that urges the retractable pin 42 toward the plate 46. The spring may be overcome by an occupant pulling the housing to retract the retractable pin 42 away from the plate 46.

Figure 3A:
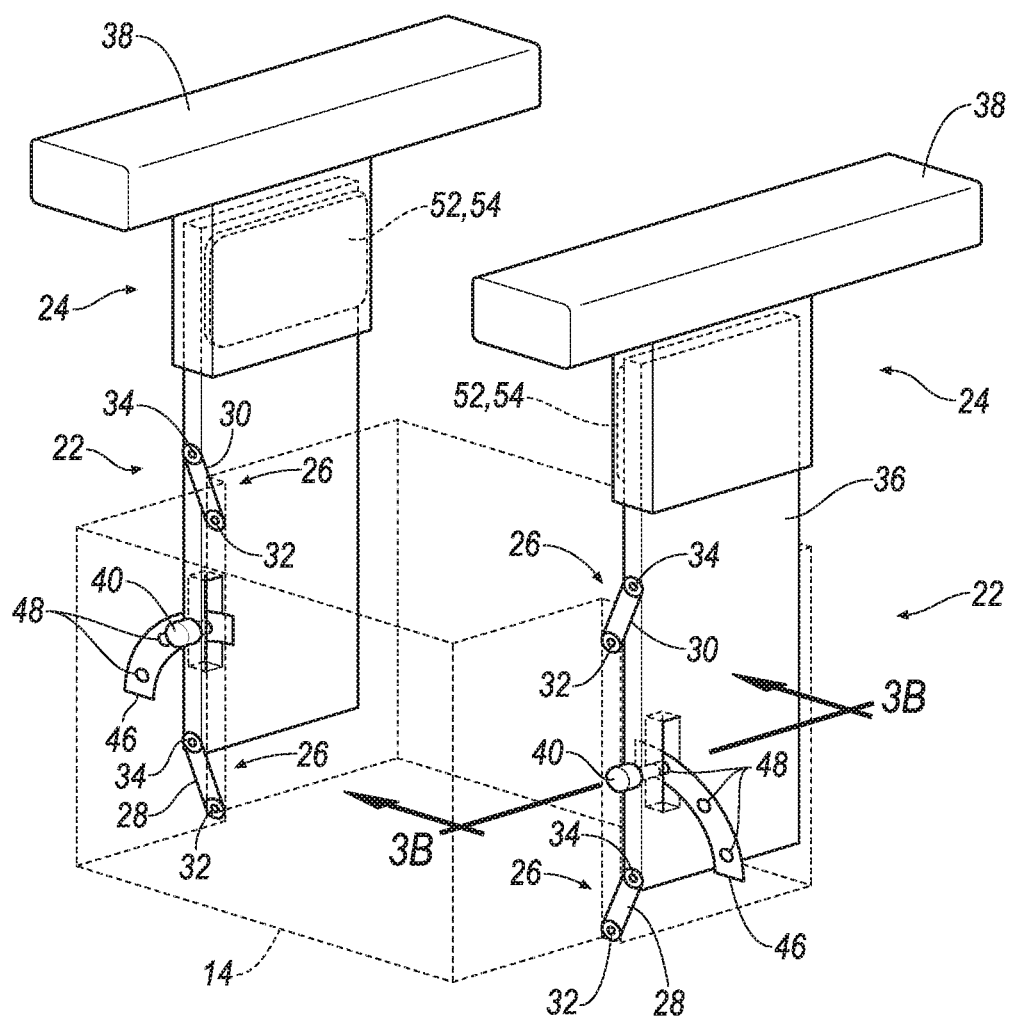
FIG. 3A is a front view of a portion of the seat and an armrest
Figure 3C:
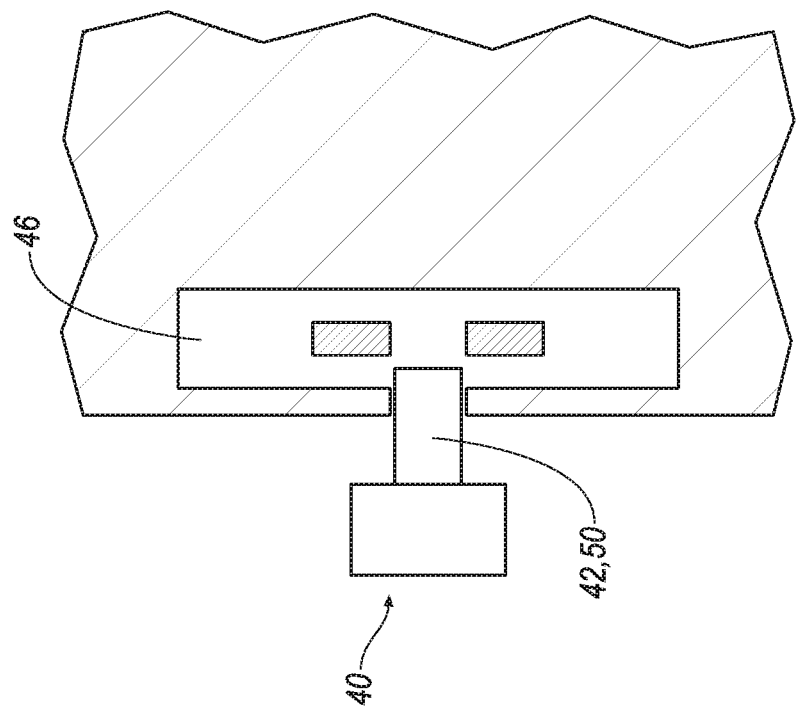
FIG. 3C is the cross-sectional view of FIG. 3B with the locking device is a disengaged position to allow adjustment of the armrest relative to the seat.
Figure 3B:
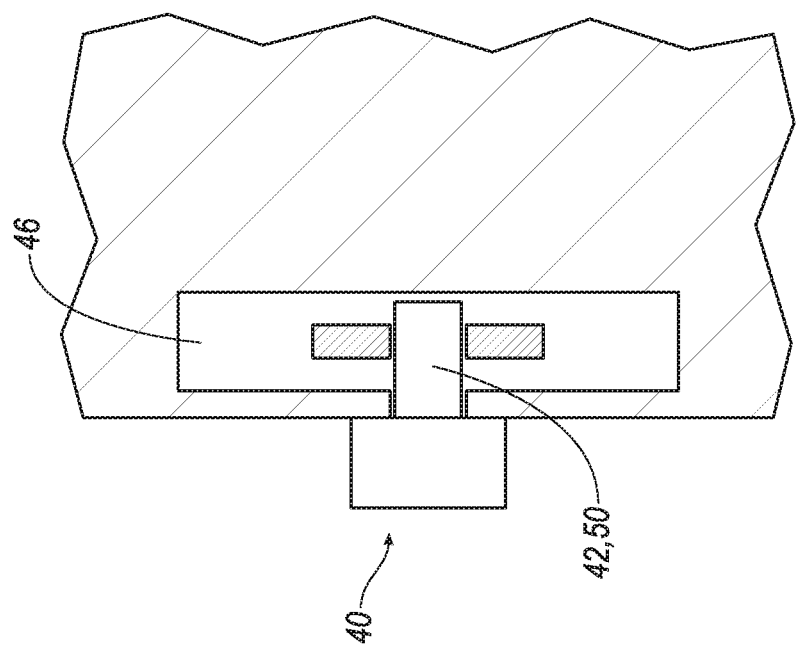
FIG. 3B is a cross-sectional view of a portion of the seat and the armrest with a locking device in an engaged position.

The armrest assembly 22 may include a plate 46 extending from the seat 12 and the locking device 40 may be selectively engaged with the plate 46. In such an example, the plate 46 is fixed relative to the seat 12. The locking device 40 may selectively engage the plate 46 in any suitable fashion. In the example shown in the figures including the spring-loaded pin assembly including the retractable pin 42, the plate 46 may include a plurality of holes 48 alternately engageable with the retractable pin 42. In other words, the retractable pin 42 may be engaged with any one of the holes 48 in the engaged position (as shown in FIG. 3B), and may be disengaged with the holes 48 in the disengaged position (as shown in FIG. 3C). The holes 48 may be spaced in an arcuate pattern. The arcuate pattern follows an outward and downward path of the armrest 24 from FIG. 4A to FIG. 4C. The plate 46 may include any suitable number of holes 48. In the alternative to the holes 48, the locking device 40 may engage the plate 46 in any suitable manner.

Figure 6A:
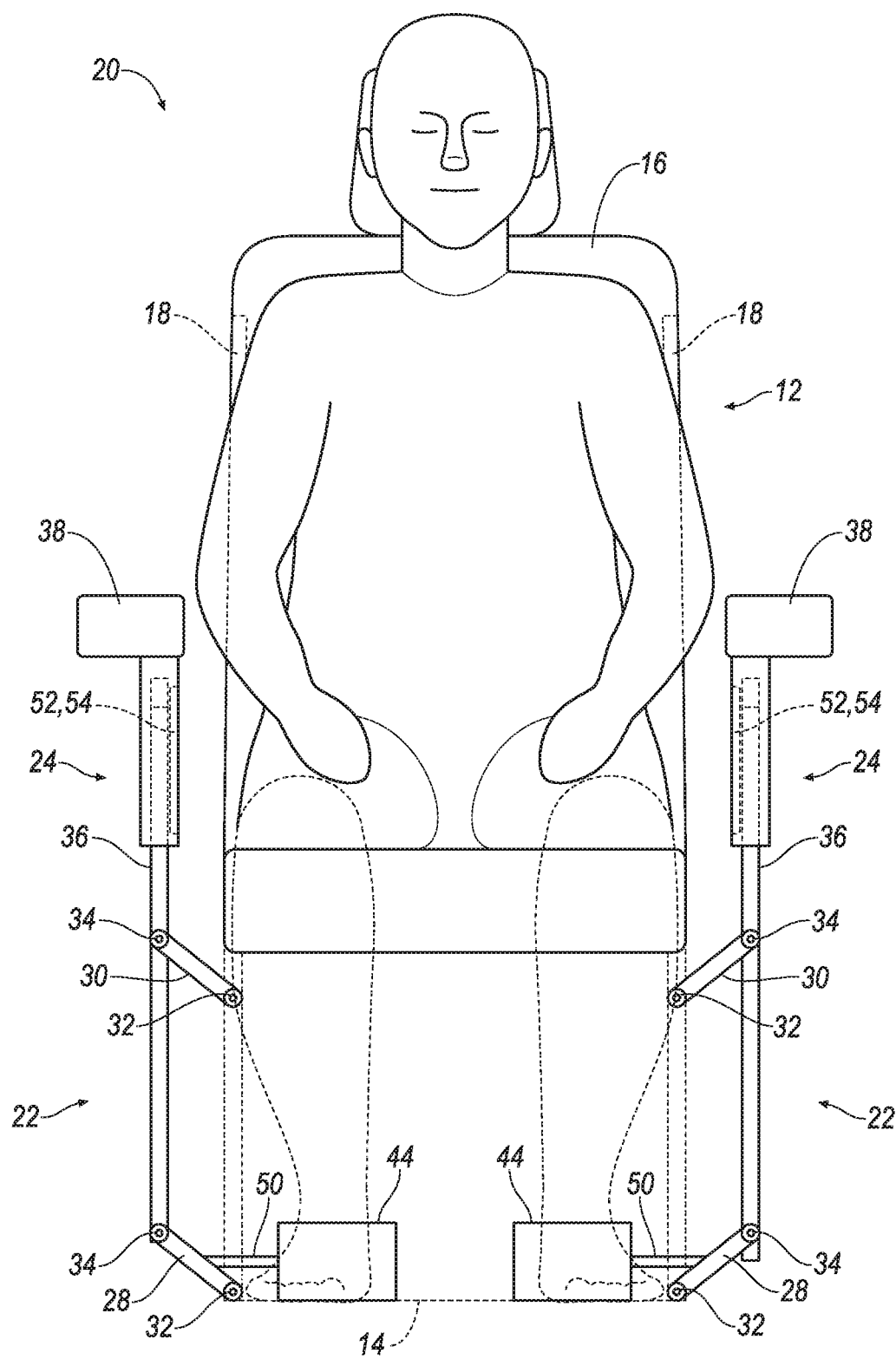
FIG. 6A is a front view of another embodiment of the seat and the armrests and a motor that adjusts the armrests relative to the seat.
Figure 6B:
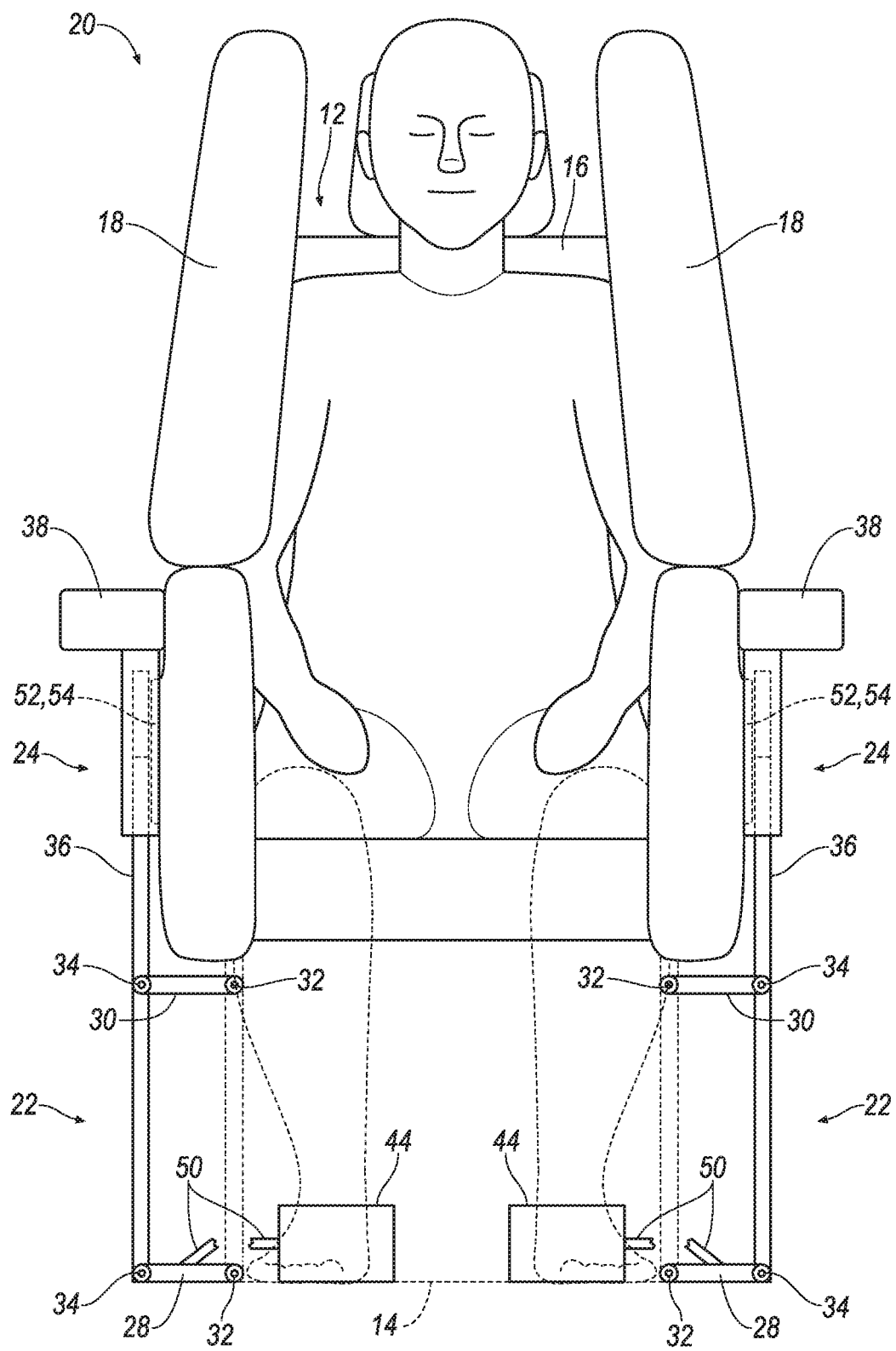
FIG. 6 B is the front view of the seat and the armrests of FIG. 6A with airbags inflated to move the armrests outwardly and with side airbags inflated.

With reference to FIG. 6A, the motor 44 is engaged with at least one of the first arm 28 and the second arm 30 to move the armrest 24 relative to the seat 12. The motor 44 may, for example, include a retractable arm engaged with one of the first arm 28 and the second arm 30. In such an embodiment, the retractable arm of the motor 44 may extend to move the armrest 24 away from the seat 12, and may retract to move the armrest 24 toward the seat 12. As another example, the motor 44 may include a rotating shaft at one of the first hinge 32s or second hinge 34s for rotating the first hinge 32 or the second hinge 34. The motor 44 may be of any suitable type.

The assembly 20 includes a releasable connection 50 between the seat 12 and the armrest 24. As set forth below, an actuator 52 breaks the releasable connection 50 to allow the armrest 24 to move relative to the seat 12. For example, the actuator 52 may force the armrest 24 away from the seat 12, i.e., outwardly, to accommodate inflation of the side airbag 18, as introduced above and described further below.

Figure 5:
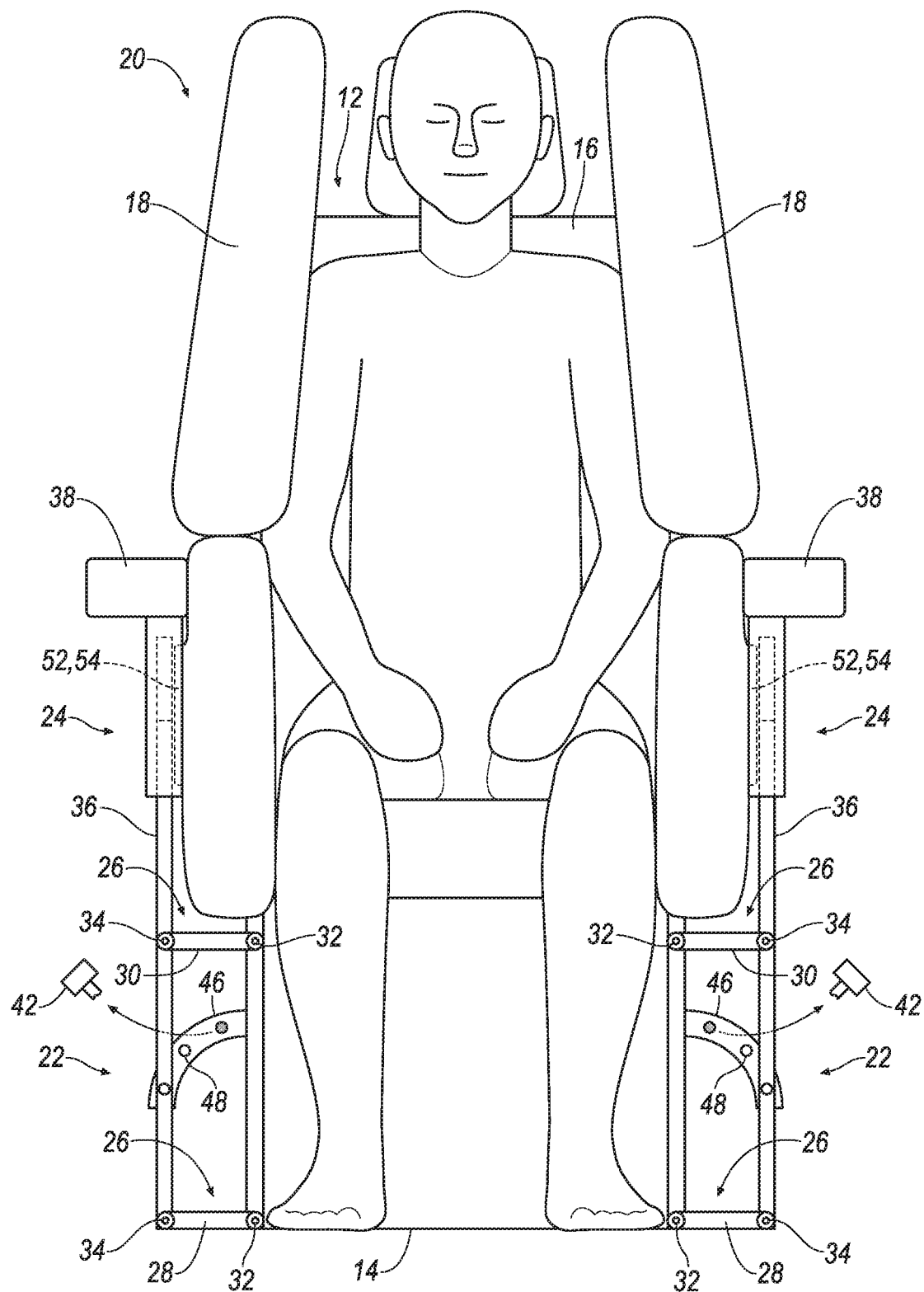
FIG. 5 is the front view of FIG. 4A with airbags inflated to move the armrests outwardly and with side airbags inflated.

In the example shown in FIGS. 3A-5 including the locking device 40, the locking device 40 may include the releasable connection 50. Specifically, the retractable pin 42 of the spring-loaded pin assembly may be the releasable connection 50. When the actuator 52 is actuated to apply force to the armrest 24 away from the seat 12, the retractable pin 42 releases to allow the armrest 24 to move away from the seat 12, as shown in FIG. 5. In such an example, the retractable pin 42 is frangible relative to the plate 46. In other words, the releasable connection 50 is first to break relative to the plate 46 in the event of external forces upon the locking device 40 over a threshold. Said differently, the releasable connection 50, e.g., the retractable pin 42, may be a shear pin In the example shown in FIGS. 6A-6B including the motor 44, the motor 44 may include the releasable connection 50. Specifically, the retractable arm or rotating shaft of the motor 44 may be the releasable connection 50. For example, as shown in FIG. 6B, the retractable arm breaks when the actuator 52 is actuated to apple force to the armrest 24 away from the seat 12.

During a vehicle impact, the actuator 52 breaks the releasable connection 50 and forces the armrest 24 outwardly, i.e., away from the occupant and the seat 12. This opens space for inflation of the side airbag 18. The actuator 52 may be, for example, an inflatable device 54, e.g., an airbag, a deployable device, etc. In such an example, the inflatable device 54 is inflatable to an inflated position between the seat 12 and the armrest 24 to force the armrest 24 away from the seat 12. The force of the inflatable device 54 on the armrest 24 breaks the releasable connection 50, as shown in FIG. 5, and forcing the armrest 24 away from the seat 12. As another example, the actuator 52 may be a pyrotechnic device.

The inflatable device 54 may be a component of an inflation module, which may include a housing, an inflator, and the inflatable device 54. The inflator and the inflatable device 54 may be disposed in the housing in an uninflated position. The housing provides a reaction surface for the inflatable device 54 in the inflated position. The housing may be formed of any material, e.g., a rigid polymer, a metal, a composite, etc. Upon receiving a signal from, e.g., the vehicle controller, the inflator may inflate the airbag with an inflatable medium, such as a gas. The inflator may be, for example, a pyrotechnic inflator that uses a chemical reaction to drive inflation medium to the airbag. The inflator may be of any suitable type, for example, a cold-gas inflator.

As set forth above, the inflatable device 54 may be an airbag. The airbag may be formed of a woven polymer or any other material. As one example, the airbag may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. As another example set forth above, the inflatable device 54 may be a deployable device. In such an example, the deployable device may be formed of thermoplastic elastomer (TPE). A thermoplastic elastomer has both thermoplastic and elastomeric properties. A thermoplastic material becomes pliable above a particular temperature and solidifies upon cooling, and an elastomer generally has a low Young's modulus and a high failure strain. Types of TPEs include styrenic block copolymers, thermoplastic olefins, elastomeric alloys, thermoplastic polyurethanes, thermoplastic copolyesters, and thermoplastic polyamides. The material forming the deployable device may be solid, in other words, not a woven fabric.

The actuator 52 is supported on one of the armrest 24 and the seat 12, and is deployable toward the other of the armrest 24 and the seat 12. In the example of the inflatable device 54, the inflatable device 54 may be supported on one of the armrest 24 and the seat 12 and is inflatable toward the other of the armrest 24 and the seat 12. As shown in the figures, the inflatable device 54 expands to fill a void between the occupant and the armrest 24 to the inflated position to force the armrest 24 away from the occupant.

In operation, the armrest 24 may be moved away from or toward the seat 12 to a position desired by the occupant, e.g., by operation of the locking device 40 or the motor 44. When the desired position of the armrest 24 is set, the top 38 of the armrest 24 may be vertically adjusted to the desired height. Upon detection of a vehicle impact, the actuator 52 is deployed to break the releasable connection 50 and force the armrest 24 away from the seat 12. This places the armrest 24 outside of a path of inflation of the side airbag 18 such that, when the side airbag 18 is inflated, the inflation of the side airbag 18 is not impeded by the armrest 24. In the example where the actuator 52 is the inflatable device 54, the inflatable device 54 in the inflated position inflates adjacent the iliac crest of the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seat having a seatback and a seat bottom extending from the seatback along a seat axis;
   an armrest mounted to the seat, the armrest being moveable relative to the seat; and
   a first arm and a second arm each including a first hinge and a second hinge, the first hinges being spaced from each other and fixed relative to the seat, the second hinges being spaced from each other and fixed relative to the armrest, the first hinge and the second hinge being rotatable about axes that are parallel to the seat axis.

2. The assembly of claim 1, further comprising an inflatable device inflatable to an inflated position, the inflatable device being between the seat and the armrest in the inflated position.

3. The assembly of claim 2, wherein the inflatable device is supported on the armrest.

4. The assembly of claim 1, further comprising an inflatable device supported on one of the armrest and the seat and inflatable toward the other of the armrest and the seat.

5. The assembly of claim 4, further comprising:
   a locking device between the armrest and the seat, the locking device being movable between an engaged position locking the armrest relative to the seat and a disengaged position releasing the armrest relative to the seat;
   the locking device including a releasable connection between the seat and the armrest; and
   the inflatable device being operable to break the releasable connection when the inflatable device is inflated.

6. The assembly of claim 1, wherein the first hinges are fixed to the seat bottom.

7. The assembly of claim 6, wherein the second hinges are fixed to the armrest.

8. The assembly of claim 1, wherein the second hinges are fixed to the armrest.

9. The assembly of claim 1, further comprising a releasable connection between the seat and the armrest.

10. The assembly of claim 1, further comprising a locking device between the armrest and the seat, the locking device being movable between an engaged position locking the armrest relative to the seat and a disengaged position releasing the armrest relative to the seat.

11. The assembly of claim 10, further comprising a plate extending from the seat, the locking device engaging the plate and the armrest in the engaged position, and disengaging the plate from the armrest in the disengaged position.

12. The assembly of claim 11, wherein plate includes a plurality of holes alternately engageable with the locking device.

13. The assembly of claim 12, wherein the holes are spaced in an arcuate pattern.

14. The assembly of claim 10, wherein the locking device includes a releasable connection between the seat and the armrest.

15. The assembly of claim 14, wherein the releasable connection is frangible relative to the plate.

16. The assembly of claim 14, wherein the releasable connection is a shear pin.

17. The assembly of claim 1, wherein the armrest includes a support member fixed relative to the second hinges of the first and second arms and a top supported by and moveably engaged with the support member.

18. The assembly of claim 17, wherein the top of the armrest is moveable vertically relative to the support member.

19. The assembly of claim 1, further comprising a motor engageable with at least one of the first arm and the second arm and designed to move the first and second arms about the first and second hinges.

20. The assembly of claim 19, further comprising a releasable connection between the motor and the at least one of the first arm and second arm, the releasable connection being frangible relative to at least one of the motor and the at least one of the first arm and the second arm.

* * * * *